United States Patent
Segawa et al.

(10) Patent No.: US 6,876,913 B2
(45) Date of Patent: Apr. 5, 2005

(54) LOCKUP CONTROL OF A TORQUE CONVERTER

(75) Inventors: Satoshi Segawa, Atsugi (JP); Kazutaka Adachi, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/660,507

(22) Filed: Sep. 12, 2003

(65) Prior Publication Data
US 2004/0078130 A1 Apr. 22, 2004

(30) Foreign Application Priority Data
Oct. 17, 2002 (JP) .......................... 2002-302894

(51) Int. Cl.⁷ .............................................. B60K 41/06
(52) U.S. Cl. ...................... 701/67; 477/176; 477/180
(58) Field of Search .......................... 701/51, 53, 55, 701/67, 68, 69; 477/169, 174, 176, 180

(56) References Cited

U.S. PATENT DOCUMENTS

| | | | |
|---|---|---|---|
| 5,195,036 A | * | 3/1993 | Kimura et al. ................ 701/66 |
| 6,066,072 A | | 5/2000 | Adachi |
| 6,152,852 A | | 11/2000 | Sakakibara et al. |
| 6,290,626 B1 | * | 9/2001 | Noda et al. ................ 477/169 |
| 6,390,950 B2 | * | 5/2002 | Noda et al. ................ 477/169 |

FOREIGN PATENT DOCUMENTS

JP  2002-130463 A  5/2002

* cited by examiner

Primary Examiner—Richard M. Camby
(74) Attorney, Agent, or Firm—Foley & Lardner LLP

(57) ABSTRACT

A torque converter (1) comprises a pump impeller (1a) and turbine runner (1b) which transmit a torque via a fluid, and a lockup clutch (2) which engage the pump impeller (1a) and turbine runner (1b) according to an oil pressure. The pump impeller (1a) is connected to an engine (21), and the turbine runner (1b) is connected to an automatic transmission (23). An oil pressure control valve (3) supplies oil pressure to the lockup clutch (2) according to a signal from the controller (5). The controller (5) calculates a rotation speed increase rate of the turbine runner (1b) (S1), and controls the oil pressure of the oil pressure control valve (3) under a pressure increase rate which increases as the rotation speed increase rate (S10) increases, thereby preventing rotation speed fluctuations of the engine (23) accompanying lockup of the lockup clutch (2).

8 Claims, 14 Drawing Sheets

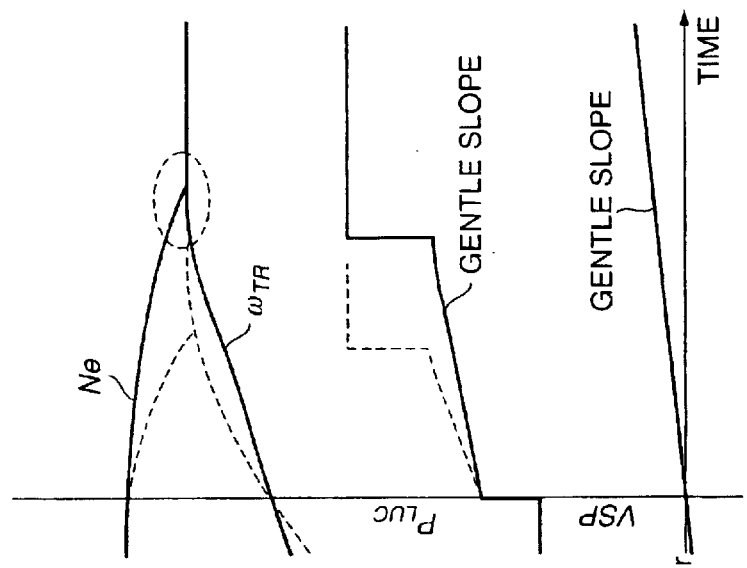
FIG. 12D
FIG. 12E
FIG. 12F
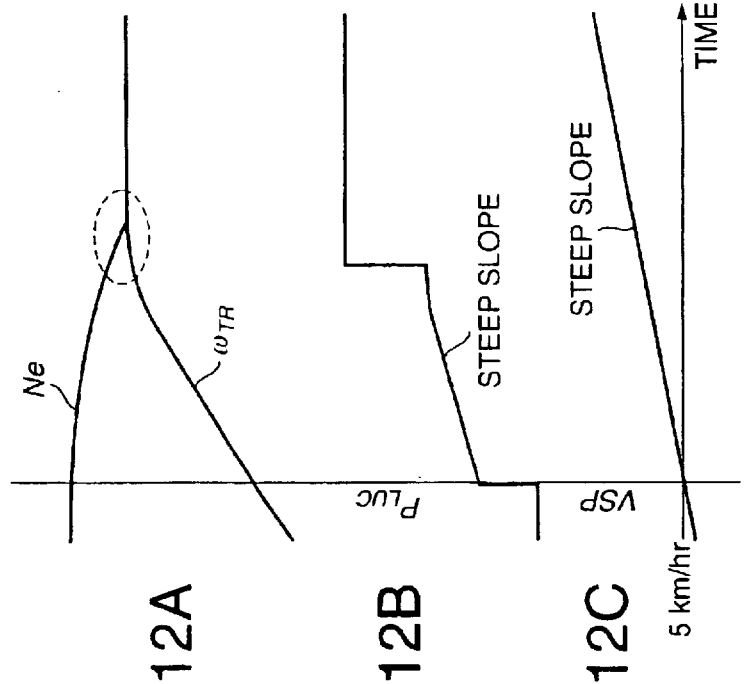
FIG. 12A
FIG. 12B
FIG. 12C

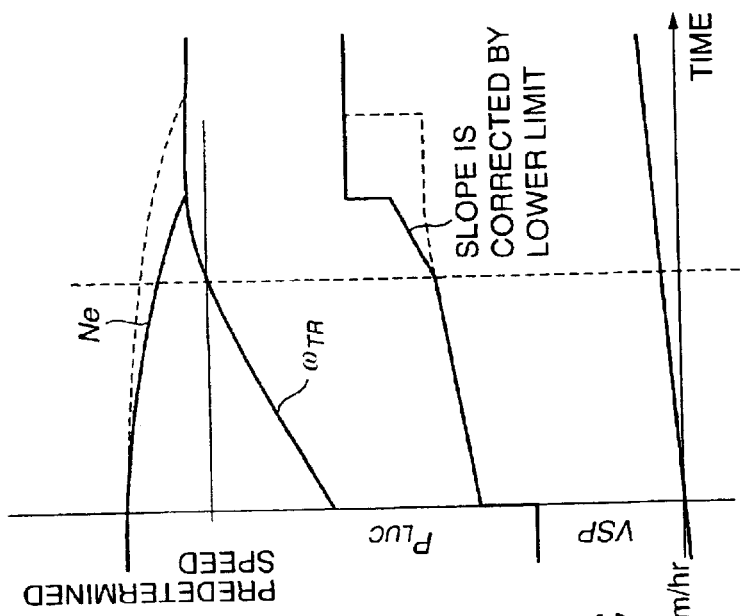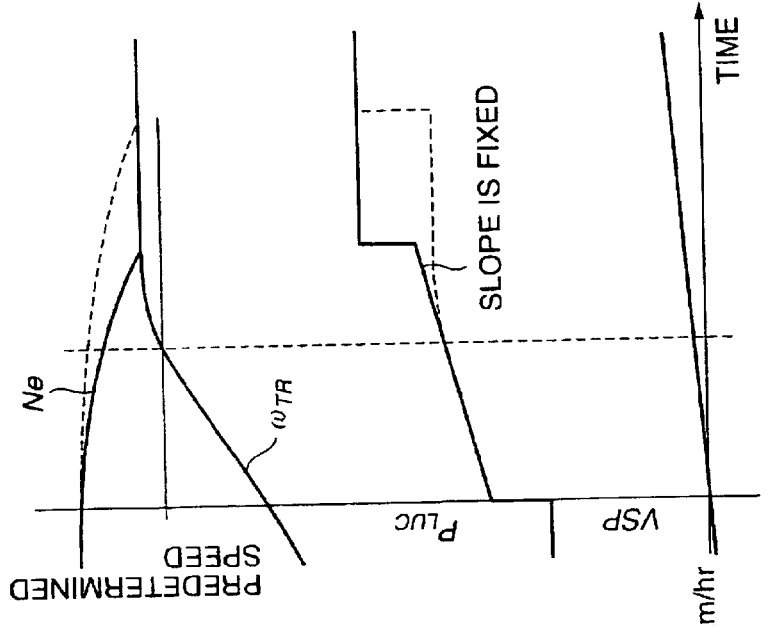

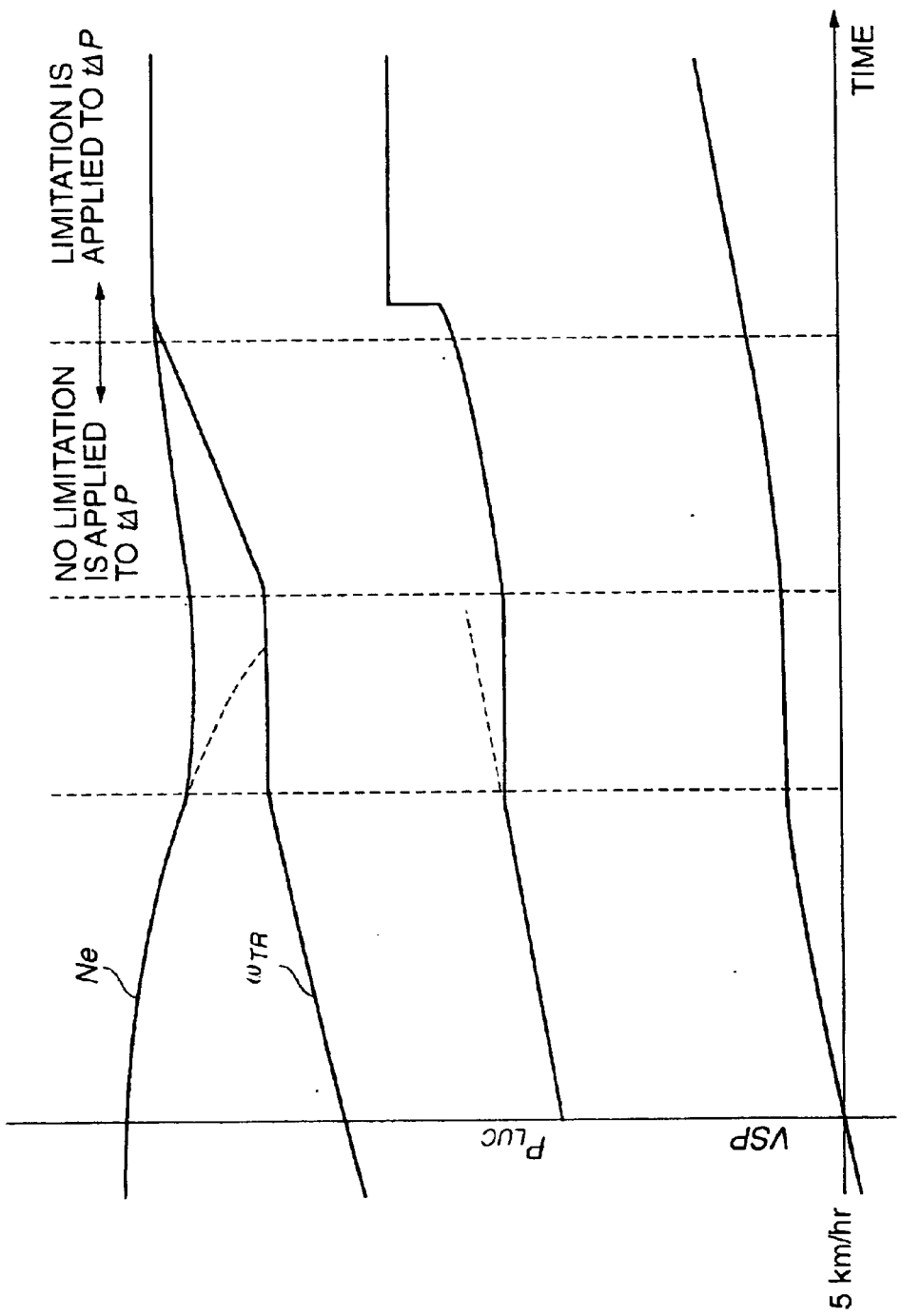

LOCKUP CONTROL OF A TORQUE CONVERTER

FIELD OF THE INVENTION

This invention relates to control of a lockup clutch with which a vehicle torque converter is provided.

BACKGROUND OF THE INVENTION

The torque converter used with a vehicle automatic transmission performs power transmission between an input element and an output element via a fluid. The input element is connected to an engine and the output element is connected to the automatic transmission. As the torque converter absorbs torque fluctuations, permits torque increase and transmits torque via the fluid, its transmission efficiency is lower than that of a friction-type clutch.

In order to increase torque transmission efficiency, a lockup clutch is known which directly connects the input element and output element under running conditions which do not require absorption of torque fluctuations or increase of torque. However, improvement in torque transmission efficiency via a fluid merely by performing ON/OFF control of the lockup clutch cannot be expected, and can only have a limiting effect.

JP2002-130463A published by the Japan Patent Office on May 9, 2002 discloses a device which controls the relative rotation speed of the input element and the output element to a target relative rotation speed by holding the lockup clutch between ON and OFF.

This control device divides the vehicle running region into a lockup region wherein the input element and output element are completely engaged, a converter region wherein the input element and output element are completely released, and a slip region set between these regions. In the slip region, a controller sets the target relative rotation speed of the input element and an output element according to an engine throttle opening, and controls the supply pressure to the lockup clutch based on the target relative rotation speed.

SUMMARY OF THE INVENTION

The lockup clutch is engaged or released according to the differential pressure between the application pressure and the release pressure which are supplied to the lockup clutch. The control device of the prior art controls the differential pressure by open loop control until the differential pressure reaches a predetermined pressure, and after the differential pressure reaches the predetermined pressure, it controls the differential pressure by feedback control. The reason why an open loop control is applied when the differential pressure is small is to ensure the tracking ability of the relative rotation speed to the target relative rotation speed.

The rotation speed of the input element of the torque converter for the same throttle opening is different when the vehicle is running on a flat road, and when it is running uphill.

In the control device according to the prior art, as the increase rate of the differential pressure in open loop control is set constant, on an upward slope as compared with a flat road, the change to feedback control from open loop control is performed at a stage where the output rotation speed of the torque converter is low and lockup is also completed in a state wherein the output rotation speed of the torque converter is low. However, when lockup is performed in a state wherein the output rotation speed is low, a large level difference arises in the engine rotation speed before and after lockup, so the engine rotation speed may show a sudden drop at the moment of lockup. This sudden drop of rotation speed has an undesirable effect on engine running performance, and causes a muffled sound or a vibrating sound.

It is therefore an object of this invention to prevent an engine rotation speed fluctuation accompanying the lockup of a lockup clutch which performs open loop control in a slip region.

In order to achieve the above object, this invention provides a lockup control device for a torque converter for a vehicle. The torque converter comprises a pump impeller and a turbine runner transmitting therebetween a torque via a fluid, and a lockup clutch which engages the pump impeller and turbine runner under an engaging force in response to an oil pressure. The device comprises an oil pressure control valve which supplies the oil pressure to the lockup clutch, a sensor which detects a rotation speed of the turbine runner, and a controller. The controller is programmed to calculate a speed increase rate of the turbine runner from the rotation speed of the turbine runner, determine a target oil pressure based on a pressure increase rate which is set to increase as the speed increase rate increases, and cause the oil pressure control valve to supply the target oil pressure to the lockup clutch.

This invention also provides a lockup control method for a torque converter for a vehicle. The torque converter comprises a pump impeller and a turbine runner transmitting therebetween a torque via a fluid, a lockup clutch which engages the pump impeller and turbine runner under an engaging force in response to an oil pressure, and an oil pressure control valve which supplies the oil pressure to the lockup clutch. The method comprising detecting a rotation speed of the turbine runner, calculating a speed increase rate of the turbine runner from a rotation speed of the turbine runner, determining a target oil pressure based on a pressure increase rate which is set to increase as the speed increase rate increases, and causing the oil pressure control valve to supply the target oil pressure to the lockup clutch.

The details as well as other features and advantages of this invention are set forth in the remainder of the specification and are shown in the accompanying drawings.

BRIEF DESCRIPTION OF THE DRAWINGS

FIGS. 12A–12F are timing charts showing the results of relative rotation control by the controller.

FIGS. 14A–14C are timing charts showing the result of relative rotation control by the controller according to the second embodiment of this invention.

FIGS. 17A–17C are timing charts showing the result of the relative rotation control by the controller according to the third embodiment of this invention.

FIGS. 18A–18C are similar to FIGS. 17A–17C, but showing a different situation.

DESCRIPTION OF THE PREFERRED EMBODIMENTS

Figure 1:
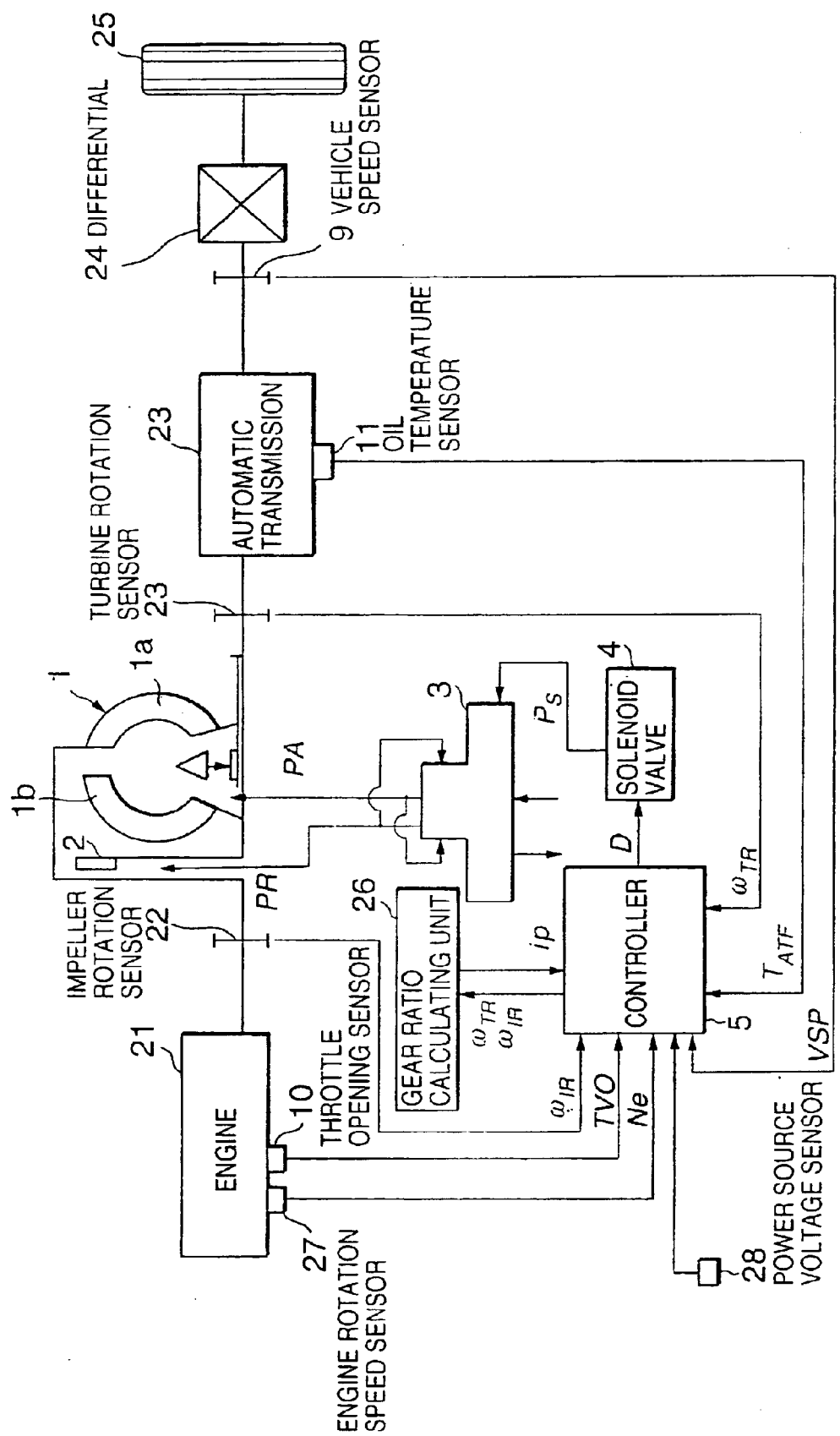
FIG. 1 is a schematic diagram of a power train of a vehicle provided with a lockup device according to this invention.

Referring to FIG. 1 of the drawings, a multi-cylinder engine 21 for a vehicle is connected to an automatic transmission 23 via a torque converter 1, and the output of the automatic transmission 23 is transmitted to a driving wheel 25 via a differential 24. Herein, the automatic transmission 23 is constituted by a continuously variable transmission.

The torque converter 1 is provided with a pump impeller 1a as an input element driven by the engine 21, a turbine runner 1b as an output element joined to the input shaft of the automatic transmission 23, and a lockup clutch 2 which directly connects the pump impeller 1a and 1 turbine runner 1b.

The engaging force of the lockup clutch 2 is determined by the differential pressure (PA–PR) between an application pressure PA and a release pressure PR.

If the application pressure PA is lower than the release pressure PR, the lockup clutch 2 will be in an unlocked state, and the pump impeller 1a and turbine runner 1b will rotate according to the torque transmission function of the fluid interposed therebetween.

When the application pressure PA is higher than the release pressure PR, the lockup clutch 2 is engaged by a force depending on the differential pressure (PA–PR).

When the differential pressure (PA–PR) is small, the pump impeller 1a and turbine runner 1b transmit a torque according to the differential pressure (PA–PR) while performing relative rotation.

If the differential pressure (PA–PR) becomes larger than a preset value, the pump impeller 1a and turbine runner 1b will be in a direct connection state without relative rotation, i.e., a lockup state.

In the state which does not result in a lockup where relative rotation is possible, the torque converter 1 delivers torque by two pathways, i.e., torque transmitted by the fluid, and by mechanical transmission by the lockup clutch 2. The engine output torque is equal to the total torque.

Therefore, if the fluid transmission torque is subtracted from the engine output torque, the torque transmitted via the lockup clutch 2 can be calculated. The transmission torque of the lockup clutch 2 is hereinafter expressed as the torque capacity of the lockup clutch 2.

The torque capacity of the lockup clutch 2 is controlled by a control device comprising a slip control valve 3 a solenoid valve 4, a controller 5 and a gear ratio calculation unit 26.

Figure 2:
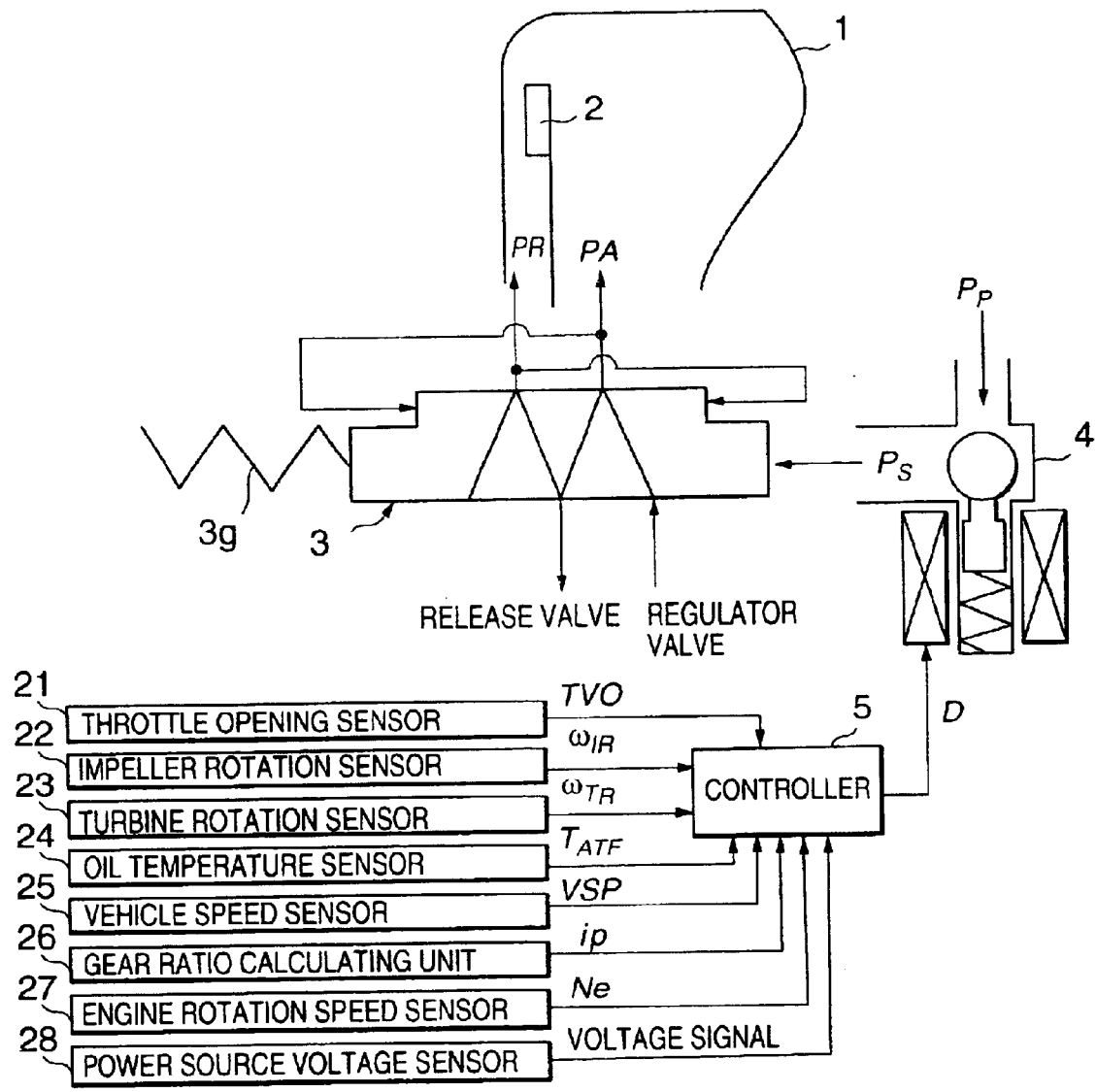
FIG. 2 is a schematic diagram of a lockup control valve according to this invention.

Referring to FIG. 2, the control valve 3 supplies the application pressure PA and release pressure PR to the lockup clutch 2 according to a signal pressure Ps input from the solenoid valve 4. The control valve 3 makes the pressure difference between the application pressure PA and release pressure PR, i.e., the engaging pressure of the lockup clutch 2, vary according to the signal pressure Ps.

The solenoid valve 4 adjusts the pump pressure Pp supplied from the oil pressure source to the signal pressure Ps using a solenoid which responds to a duty signal D. The duty signal D is outputted from the controller 5.

The controller 5 comprises a microcomputer provided with a central processing unit (CPU), read-only memory (ROM), random access memory (RAM) and input/output interface (I/O interface). The controller may also comprise plural microcomputers.

The controller 5 controls the differential pressure (PA–PR) applied to the lockup clutch 2 in the above construction as in JP2002-130463A of the prior art according to whether the operating state of the engine 21 corresponds to a converter region, a slip region or a lockup region. In the first half of the slip region, open loop control of the differential pressure (PA–PR) is performed, and in the second half of the slip region, feedback control of the differential pressure (PA–PR) is performed. The controller 5 controls the differential pressure (PA–PR) by the output of the duty signal D to the solenoid valve 4.

To generate the duty signal D, signals are input to the controller 5 from a throttle opening sensor 10 which detects a throttle opening TVO of the engine 21, an impeller rotation sensor 7 which detects a rotation speed $\omega_{IR}$ of the pump impeller 1a, a turbine rotation sensor 8 which detects a rotation speed $\omega_{TR}$ of the turbine runner 1b, an oil temperature sensor VSP which detects an oil temperature $T_{ATF}$ of the automatic transmission 23, a vehicle speed sensor 9 which detects a vehicle speed VSP, an engine rotation speed sensor 27 which detects an engine rotation speed Ne, a power source voltage sensor 28 which detects a voltage of energizing electricity supplied to the solenoid valve 4, and a signal which shows a calculation result from a gear ratio calculation unit 26, respectively.

The gear ratio calculation unit 26 calculates a real gear ratio ip of the automatic transmission 23 from the rotation speed $\omega_{TR}$ of the turbine runner 1b and the vehicle speed VSP, and inputs it to the controller 5. The gear ratio calculation unit 26 comprises the same microcomputer as that of controller 5. The controller 5 and the gear ratio calculation unit 26 may also comprise the same microcomputer.

Next, referring to FIG. 7, a lockup engaging pressure control routine performed by the controller 5 will be described. This routine is executed at an interval of twenty milliseconds during the operation of the engine 21.

First, in a step S1, the controller 5 calculates an increase rate $\Delta Npri$ of an input rotation speed Npri of the automatic transmission 3 by the following equation (1). The input rotation speed Npri of the automatic transmission 3 is equal to the rotation speed $\omega_{TR}$ of the turbine runner 1b.

$$\Delta Npri = Npri - Npri_{-100} \tag{1}$$

where, $Npri_{-100}$=Npri measured at a hundred milliseconds ago.

In a next step S2, the controller 5 determines whether or not the running condition of the vehicle corresponds to the slip region of the torque converter 1. Herein, the slip region corresponds to a region where the vehicle speed VSP is within a predetermined range while the throttle opening TVO is not larger than a predetermined opening TVO1.

When, in the step S2, the vehicle operating condition corresponds to the slip region, the controller 5 preforms a processing of a step S5. When the vehicle operating condition does not correspond to the slip region, the controller 5 determines in a step S3 if the vehicle operating condition corresponds to the lockup region. When the vehicle operating condition does not correspond to the slip region, it must correspond to the lockup region or converter region. In the step S3, when the vehicle speed is less than a predetermined vehicle speed, it is determined that the operating condition corresponds to the converter region, and if the vehicle speed is not less than the predetermined vehicle speed, it is determined that the operating condition corresponds to the lockup region. The predetermined vehicle speed is herein set to five kilometers per hour (5 km/hour). When the operating condition does not correspond to the lockup region in the step S3, in other words, when it corresponds to the converter region, the controller 5 releases the lockup clutch 2 in a step S16.

Specifically, the differential pressure (PA–PR) is controlled so that the application pressure PA is lower than the release pressure PR. As a result, the output rotation of the engine 21 is exclusively transmitted to the automatic transmission 23 via the fluid in the torque converter 1. After the processing of the step S16, the controller 5 terminates the routine.

When in the step S3, the operating condition corresponds to the lockup region, in a step S4 the controller 5 determines whether or not the lockup operation of the lockup clutch 2 has been completed. In other words, it determines if the differential pressure (PA–PR) of the lockup clutch 2 has reached a predetermined lockup differential pressure. As the differential pressure (PA–PR) is produced as a result of the command signal D which the controller 5 outputs to the solenoid valve 4, the differential pressure (PA–PR) is a value known by the controller 5.

When the differential pressure (PA–PR) has reached the predetermined lockup differential pressure in the step S4, the lockup clutch 2 has been locked up. In this case, in a step S15, the controller 5 maintains the differential pressure (PA–PR) at the lockup differential pressure. As a result, the output rotation of the engine 21 is transmitted to the automatic transmission 23 via the lockup clutch 2 in the lockup state. After the processing of the step S15, the controller 5 terminates the routine.

When the differential pressure (PA–PR) has not reached the predetermined lockup differential pressure in the step S4, it means that the lockup clutch 2 has not yet been locked up. In this case, the controller 5 performs the processing of the step S5 as in the case where the operating condition corresponds to the slip region.

In the step S5, the controller 5 determines whether the processing of the converter region, i.e., the release processing of the lockup clutch of the step S16, was performed on the immediately preceding occasion when the routine was executed. In other words, it is determined whether or not the processing of the step S5 is performed for the first time since the vehicle speed VSP exceeded 5 km/hour in the step S2.

Figure 8:
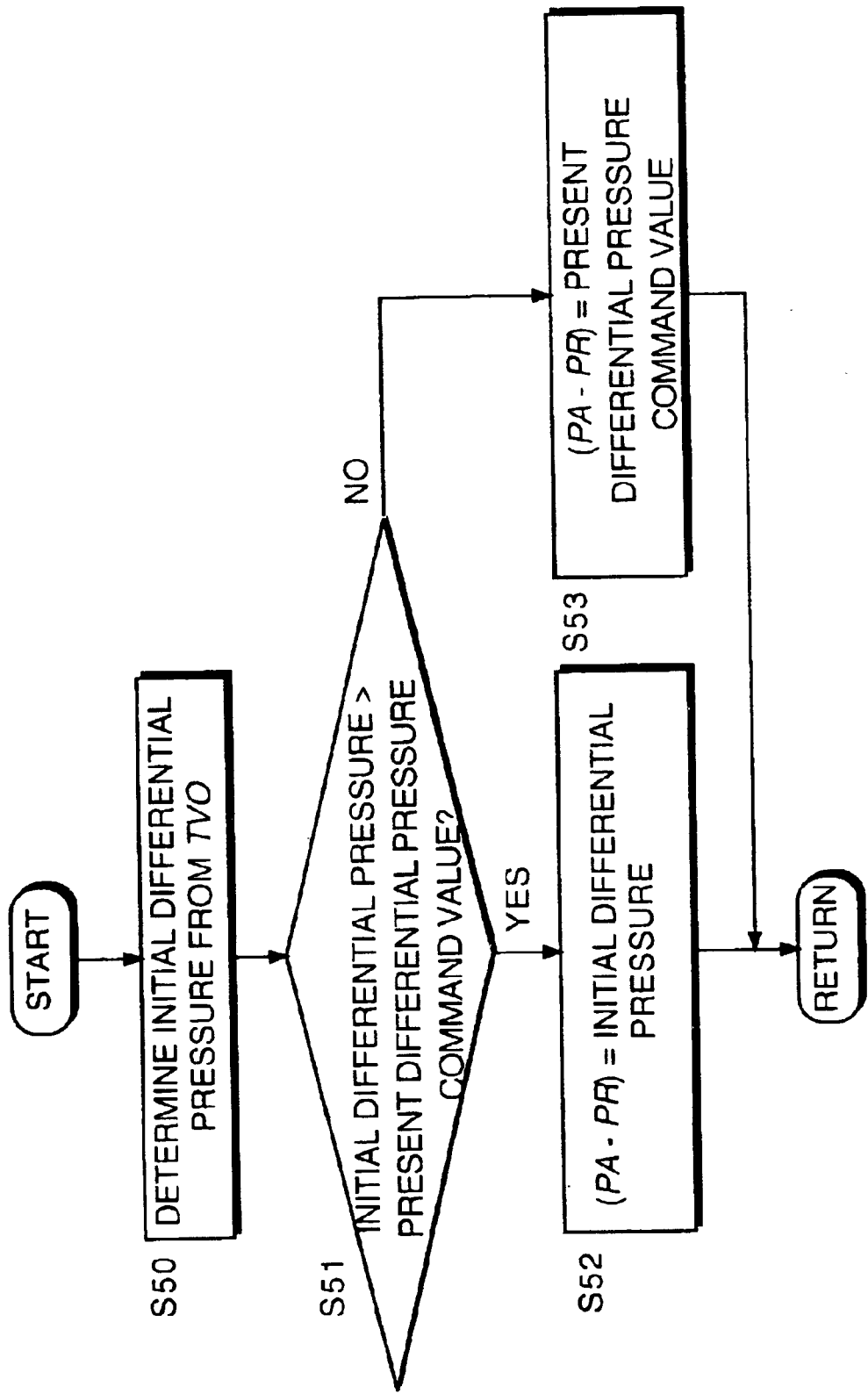
FIG. 8 is a flowchart describing an initial differential pressure setting subroutine performed by the controller.

If the processing of the converter region was performed on the immediately preceding occasion the routine was executed, in a step S6 the controller 5 sets the present differential pressure (PA–PR) using a subroutine shown in FIG. 8.

Figure 9:
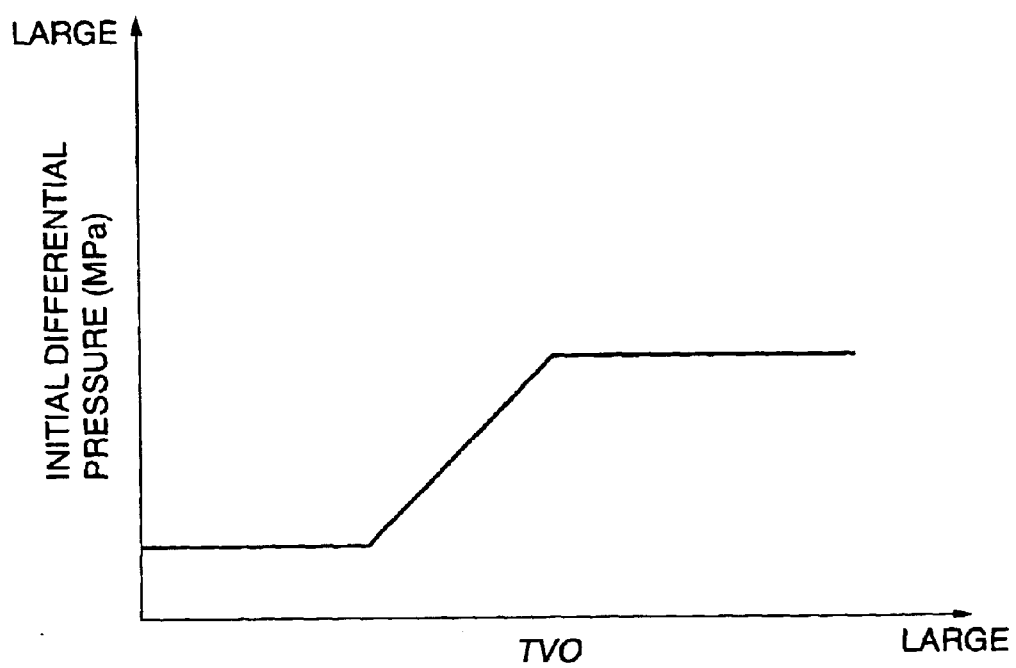
FIG. 9 is a diagram describing the characteristics of an initial differential pressure map stored by the controller.

Referring to FIG. 8, in a step S50, the controller 5 calculates an initial differential pressure of the lockup clutch 2 from the throttle opening TVO detected by the throttle opening sensor 10 by looking up a map having the characteristics shown in FIG. 9. This map is prestored in the memory (ROM) of the controller 5.

In a following step S51, the controller 5 determines whether or not the initial differential pressure is larger than the present differential pressure command value. The present differential pressure command value is the differential pressure corresponding to the newest duty signal D currently outputted to the solenoid valve 4 from the controller 5.

When the initial differential pressure is larger than the present differential pressure command value, in a step S52, the controller 5 sets the present differential pressure (PA–PR) equal to the initial differential pressure. When the initial differential pressure is not larger than the present differential pressure command value, the controller 5 sets the present differential pressure (PA–PR) equal to the present differential pressure command value in a step S53. After the processing of the step S52 or the step S53, the controller 5 terminates the subroutine.

Referring again to FIG. 7, after setting the present differential pressure (PA–PR) in the step S6, in a step S7, the controller 5 sets an open-loop control flag to unity. The open-loop control flag is a flag which shows that open loop control of the differential pressure of the lockup clutch 2 is performed, and its initial value is zero.

After the processing of the step S7, the controller 5 performs the processing of a step S8. When the determination of the step S5 is negative, i.e., when processing of the converter region was not performed on the immediately preceding occasion when the routine was executed, the controller 5 skips the steps S6 and S7, and performs the processing of the step S8.

In the step S8, the controller 5 determines whether or not the open loop flag is unity. When the open loop flag is not unity, this is the case where the lockup clutch 2 is in the slip region, and open loop control is not performed. As mentioned above, open loop control is performed in the first half of the slip region, and feedback control is performed in the second half. When the open-loop control flag is not unity in the step S8, the controller 5 therefore performs feedback control of the differential pressure (PA–PR) in a step S14. This feedback control is described later.

Figure 10:
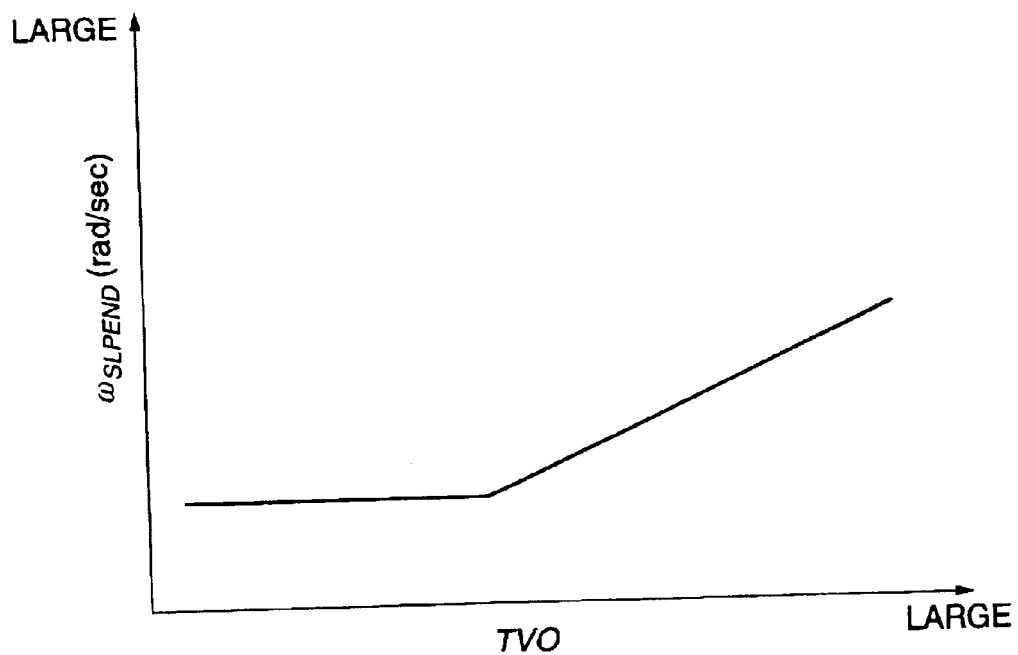
FIG. 10 is a diagram describing the characteristics of a map for open-loop control end determination stored by the controller.

When the open loop flag is unity in the step S8, the controller 5, in a step S9, calculates an open-loop control end relative rotation speed $\omega_{SLPEND}$ from the throttle opening TVO by looking up a map having the characteristics shown in FIG. 10. This map is prestored in the memory (ROM) of the controller 5. The open-loop control end relative rotation speed $\omega_{SLPEND}$ is the relative rotation speed of the pump impeller 1a and turbine runner 1b which is used to determine whether or not to terminate open loop control of the differential pressure (PA–PR). The open-loop control end relative rotation speed $\omega_{SLPEND}$ increases as the throttle opening TVO becomes larger, as shown in the figure. The controller 5 compares the calculated open-loop control end relative rotation speed $\omega_{SLPEND}$ with a present real relative rotation speed $\omega_{SLPR}$. The real relative rotation speed $\omega_{SLPR}$ is the difference of the rotation speed $\omega_{IR}$ of the pump impeller 1a, and the rotation speed $\omega_{TR}$ of the turbine runner 1b.

When, as a result of this comparison, the real relative rotation speed $\omega_{SLPR}$ exceeds the open-loop control end relative rotation speed $\omega_{SLPEND}$, it means that the vehicle running condition is still the open-loop control condition of the differential pressure (PA–PR). In this case, the controller 5, in a step S10, calculates a target increase rate tΔP of the differential pressure (PA−PR) in open loop control. This calculation is performed by looking up a map having the characteristics shown in FIG. 11 from the increase rate ΔNpri of the input rotation speed Npri of the automatic transmission 3 calculated in the step S1. This map is prestored in the memory (ROM) of the controller 5.

Figure 11:
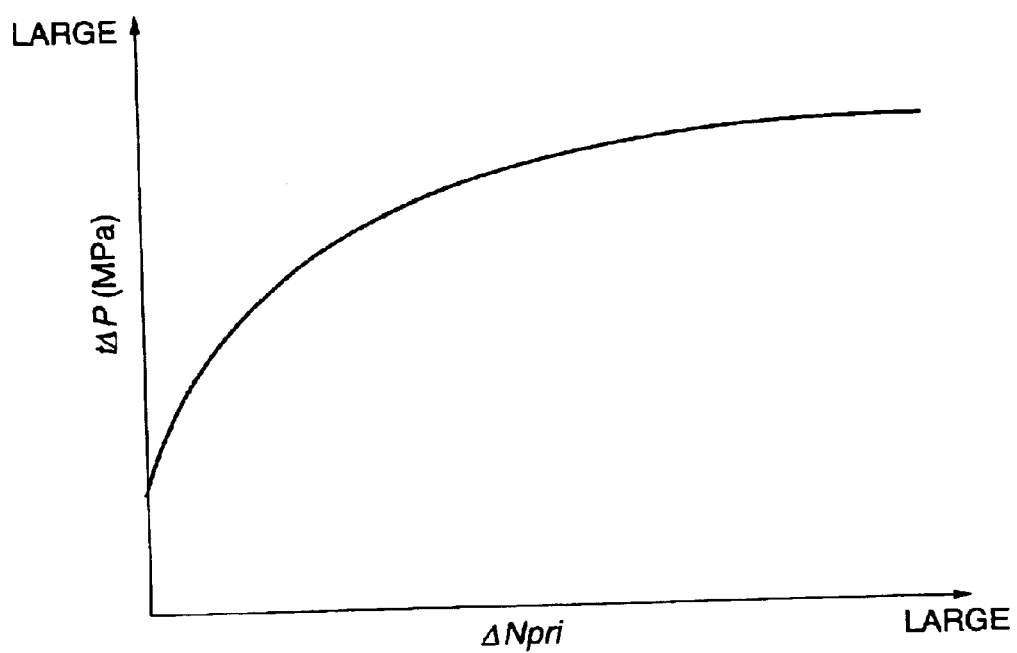
FIG. 11 is a diagram describing the characteristics of a differential pressure increase rate map stored by the controller.

The vertical axis of FIG. 11 shows a target increase rate tΔP, i.e., the target increase amount per unit time of the differential pressure (PA−PR). Let the unit be a megapascal (MPa). Unit time is twenty milliseconds which is the execution interval of the routine. The target increase rate tΔP of differential pressure (PA−PR) also increases, the larger is the increase rate ΔNpri of the input rotation speed Npri of the automatic transmission 3, as shown in the figure.

In a following step S11, the controller 5 sets a value obtained by adding the target increase rate tΔP to the present differential pressure (PA−PR) as a target differential pressure $P_{LUC}$, and outputs a duty signal D corresponding to the target differential pressure $P_{LUC}$ to the solenoid valve 4. After the processing of the step S11, the controller 5 terminates the routine.

On the other hand, when a real relative rotation speed $\omega_{SLPR}$ is not larger than the open-loop control end relative rotation speed $\omega_{SLPEND}$ in the step S9, the controller 5, in a step S12, initializes the feedback control system. This is a measure for shifting to feedback control from open loop control of the differential pressure (PA−PR).

In a following step S13, the controller 5 resets the open-loop control flag to zero.

In a following step S14, the controller 5 performs feedback control of the differential pressure (PA−PR). After the processing of the step S14, the controller 5 terminates the routine.

Figure 3:
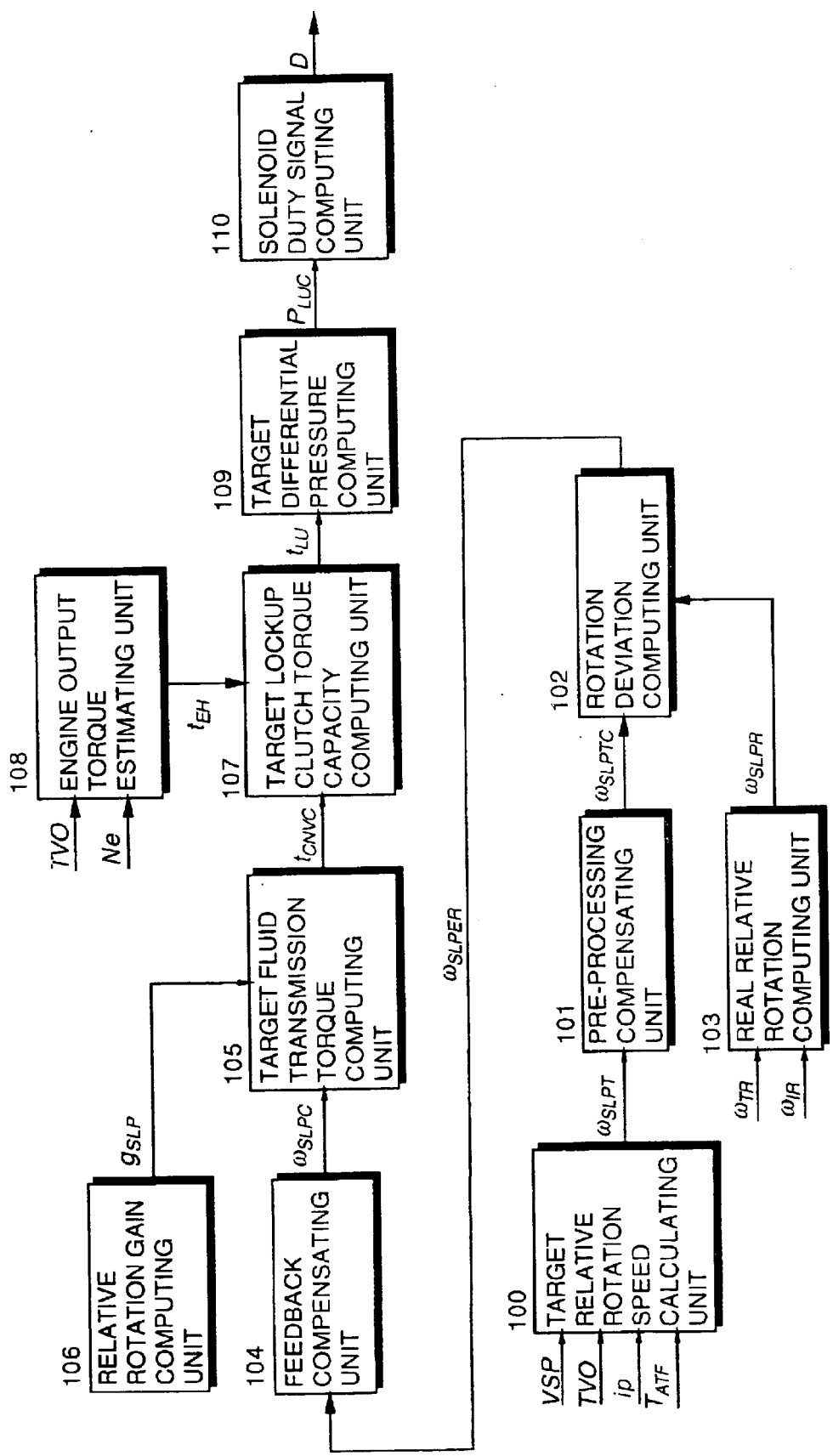
FIG. 3 is a block diagram describing the function of a controller according to this invention.

Next, referring to FIG. 3, the feedback control of the differential pressure (PA−PR) performed by the controller 5 in the step S14 will be described.

For feedback control, the controller 5 comprises various kinds of processing units as shown in the figure. However, these units are imaginary units for describing the feedback control function of the controller 5, and do not exist physically.

A target relative rotation speed computing unit 100 determines a target relative rotation speed $\omega_{SLPT}$ of the pump impeller 1a and turbine runner 1b based on the vehicle speed VSP, the throttle opening TVO, the speed ratio ip and the oil temperature $T_{ATF}$. The target relative rotation speed $\omega_{SLPT}$ is the minimum relative rotation speed at which output torque fluctuations due to scatter in the combustion of engine 21 or muffled noise emitted by the power train due to output torque fluctuations can be absorbed within tolerance limits, and is preset according to the aforesaid input conditions by experiment.

A real relative rotation speed computing unit 103 computes a real relative rotation speed $\omega_{SLPR}$ of the pump impeller 1a and turbine runner 1b by subtracting the rotation speed $\omega_{TR}$ of the turbine runner 1b from the rotation speed $\omega_{IR}$ of the pump impeller 1a. Herein, the rotation speed $\omega_{IR}$ of the pump impeller 1a is equal to the engine rotation speed Ne, and the rotation speed $\omega_{TR}$ of the turbine runner 1b is equal to the input shaft rotation speed of the automatic transmission 23.

A pre-processing compensating unit 101 computes a corrected target relative rotation speed $\omega_{SLPTC}$ by passing a target relative rotation speed $\omega_{SLPT}$ through a filter set so that the response intended by the designer is obtained. The structure and mechanism of the pre-processing compensating unit are known from U.S. Pat. Nos. 6,066,072 and 6,152,852.

A rotation deviation computing unit 102 calculates a deviation $\omega_{SLPER}$ of the corrected target relative rotation speed $\omega_{SLPTC}$ and the real relative rotation speed $\omega_{SLPR}$ by the following equation (2):

$$\omega_{SLPER} = \omega_{SLPTC} - \omega_{SLPR} \quad (2)$$

A feedback compensating unit 104 computes a relative rotation speed command value $\omega_{SLPC}$ by the following equation (3) representing proportional/integral control by making the relative rotation speed error $\omega_{SLPER}$ zero, i.e., so that the real relative rotation speed $\omega_{SLPR}$ is equal to the corrected target relative rotation speed $\omega_{SLPTC}$.

$$\omega_{SLPC} = Kp \cdot \omega_{SLPER} + \frac{Ki}{s} \cdot \omega_{SLPER} \quad (3)$$

where, Kp=proportional gain.
Ki=integral gain, and
s=differential operator.

The proportional gain Kp and integral gain Ki are preset by experiment.

Figure 4:
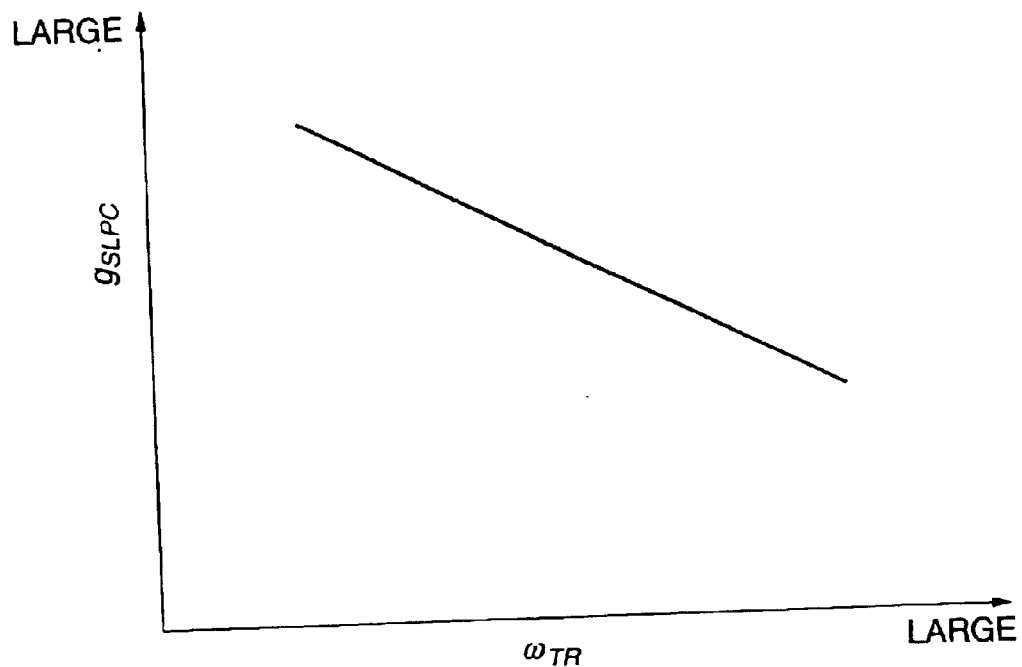
FIG. 4 is a diagram describing the characteristics of a map of relative rotation gain stored by the controller.

In a relative rotation gain computing unit 106, a relative rotation gain $g_{SLPC}$ is calculated from the rotation speed $\omega_{TR}$ of the turbine runner 1b by looking up a map having the characteristics shown in FIG. 4. A target fluid transmission torque computing unit 105 computes a target fluid transmission torque $t_{CNVC}$ for reaching the relative rotation speed command value $\omega_{SLPC}$ to the rotation speed $\omega_{TR}$ of the turbine runner 1b, by the following equation (4):

$$t_{cnvc} = \frac{\omega_{SLPC}}{g_{SLPC}} \quad (4)$$

Figure 5:
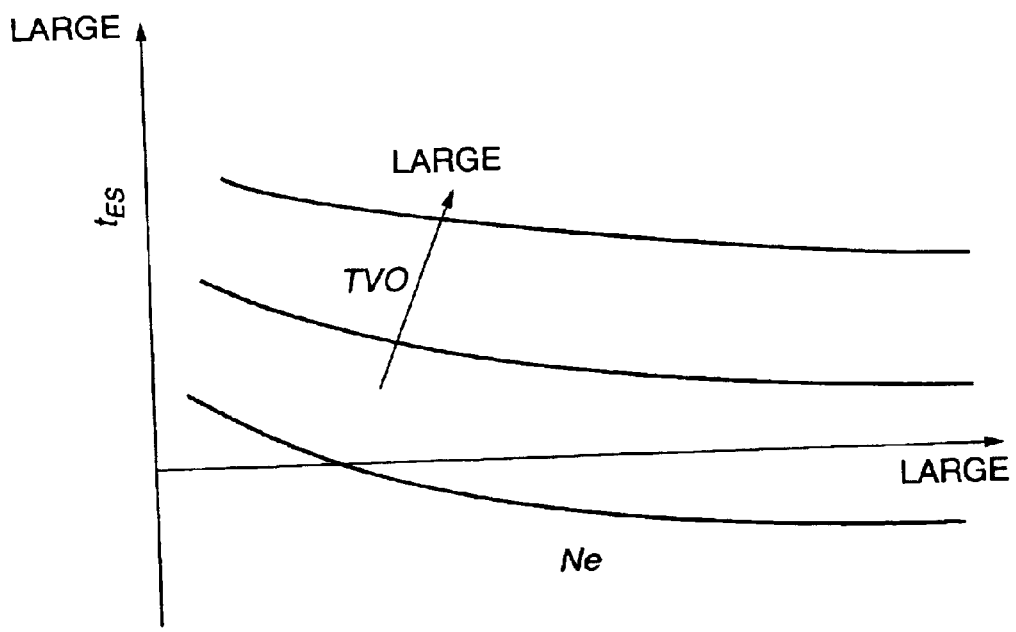
FIG. 5 is a diagram describing the characteristics of a map of engine performance stored by the controller.

An engine output torque estimating unit 108 calculates an engine output torque steady value $t_{ES}$ from the engine rotation speed Ne and throttle opening TVO by looking up a map having the characteristics shown in FIG. 5. The engine output torque estimating unit 108 adds filter processing shown in the following equation (5) to the engine output torque steady value $t_{ES}$ using a time constant $T_{ED}$ showing the first-order delay of the dynamic characteristics of the engine 21, and calculates an engine output torque $t_{EH}$.

$$t_{EH} = \frac{1}{1 + T_{ED} \cdot s} \cdot t_{ES} \quad (5)$$

A target lockup clutch torque capacity computing unit 107 calculates a target lockup clutch torque capacity $t_{LU}$ by subtracting the target converter torque $t_{CNVC}$ from the engine output torque $t_{EH}$ obtained by equation (5), by equation (6):

$$t_{LU} = t_{EH} - t_{CNVC} \quad (6)$$

Figure 6:
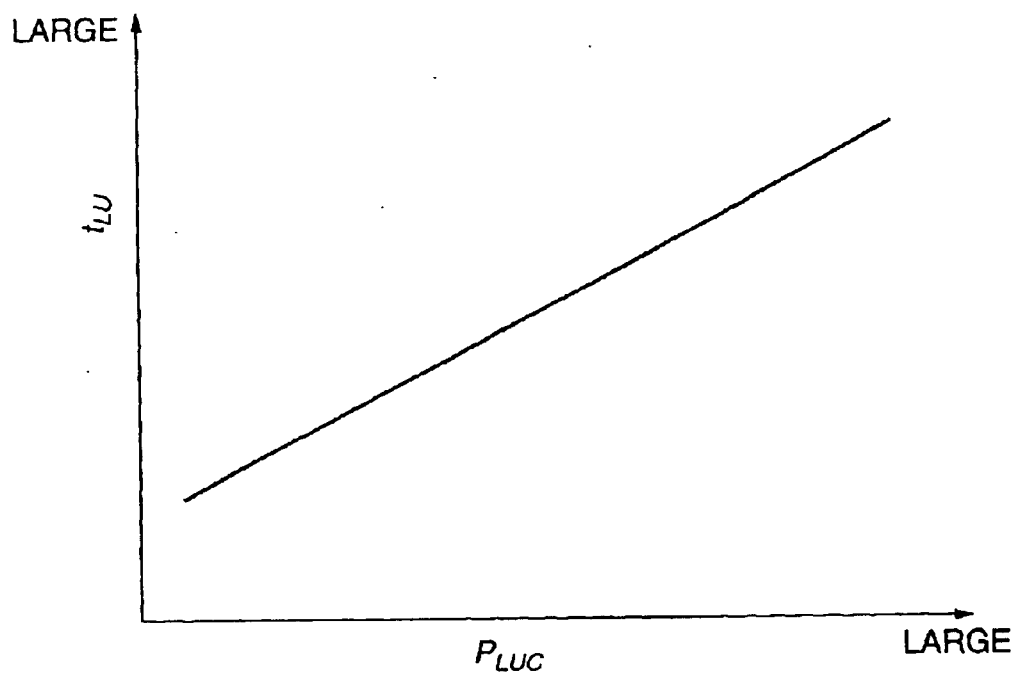
FIG. 6 is a diagram describing the characteristics of a map of lockup clutch torque capacity stored by the controller.

A target differential pressure computing unit 109 calculates a target differential pressure $P_{LUC}$ from the target lockup clutch torque capacity $t_{LU}$ by looking up a map having the characteristics shown in FIG. 6. This map is defined experimentally.

A solenoid duty signal computing unit 110 determines the duty signal D which corresponds to the target differential pressure $P_{LUC}$, and outputs it to the lockup control solenoid valve 4. The correspondence depends on the voltage of energizing electricity supplied to the solenoid valve 4, so the controller 5 uses the signal input from the power source voltage sensor 28 to determine the duty signal D.

Next, referring to FIGS. 12A–12F, the variation of differential pressure applied to the lockup clutch 2 under the above-mentioned control by the controller 5 will be described.

FIGS. 12A–12C show the variation of the lockup clutch differential pressure on a flat road. FIGS. 12D–12F show the variation of the lockup clutch differential pressure on an uphill road. The throttle opening TVO is assumed to be identical.

As shown in FIG. 12C and FIG. 12F, as the slope of the increase in the vehicle speed VSP on an uphill road is smaller than that on a flat road, the slope of the increase in the rotation speed $\omega_{TR}$ of the turbine runner 1b is also smaller on an uphill road than that on a flat road. As the rotation speed $\omega_{TR}$ of the turbine runner 1b is equal to the input rotation speed Npri of the automatic transmission 3, the increase rate ΔNpri of the input rotation speed Npri calculated in the step S1 is a value smaller on an uphill road than on a flat road. The target increase rate tΔP of the differential pressure (PA–PR) calculated in the step S9 depends on the increase rate ΔNpri as shown in FIG. 11, and is also a value smaller on an uphill road than on a flat road. As a result, as shown in FIG. 12B and FIG. 12E, the value of the target differential pressure $P_{LUC}$ is smaller on an uphill road than on a flat road, and time for the lockup clutch 2 to lock up is longer on an uphill road than on a flat road.

As a result, as shown in FIG. 12D, on an uphill road, the fluctuation of the engine rotation speed Ne accompanying lockup of the lockup clutch 2 is small, and lockup of the lockup clutch 2 is performed smoothly. On the other hand, if the same target increase rate tΔP as on a flat road is applied on an uphill road as shown by the dotted line of FIG. 12E, as a result of performing lockup of the lockup clutch 2 at an early stage as shown by the dotted line of FIG. 12D, the engine rotation speed Ne may largely drop, and shock and noise may occur due to lockup.

Figure 7:
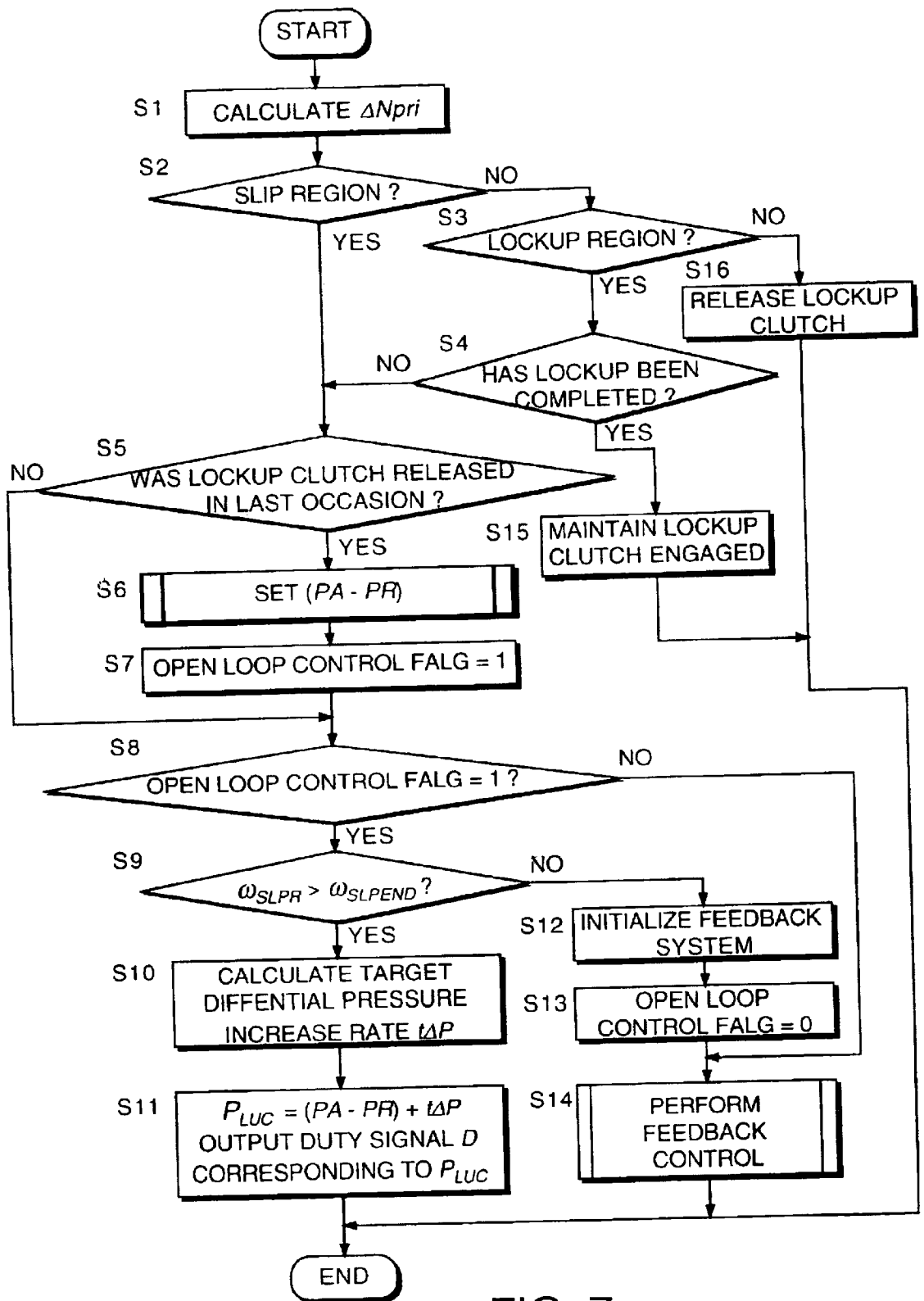
FIG. 7 is a flowchart describing an engagement pressure control routine of the lockup clutch performed by the controller.

According to the routine of FIG. 7, even when the lockup clutch 2 is in a region other than the slip region, the increase rate ΔNpri of the input rotation speed Npri is calculated in the step S1. Therefore, the controller 5 can set the target differential pressure $P_{LUC}$ using the exact increase rate ΔNpri, immediately after the lockup clutch 2 enters the slip region.

Next, referring to FIG. 13, a second embodiment of this invention relating to the routine for controlling the lockup pressure, will be described. In this embodiment instead of the routine of FIG. 7, the controller 5 performs a routine of FIG. 13. The remaining features of the construction are identical to those of the first embodiment.

Figure 13:
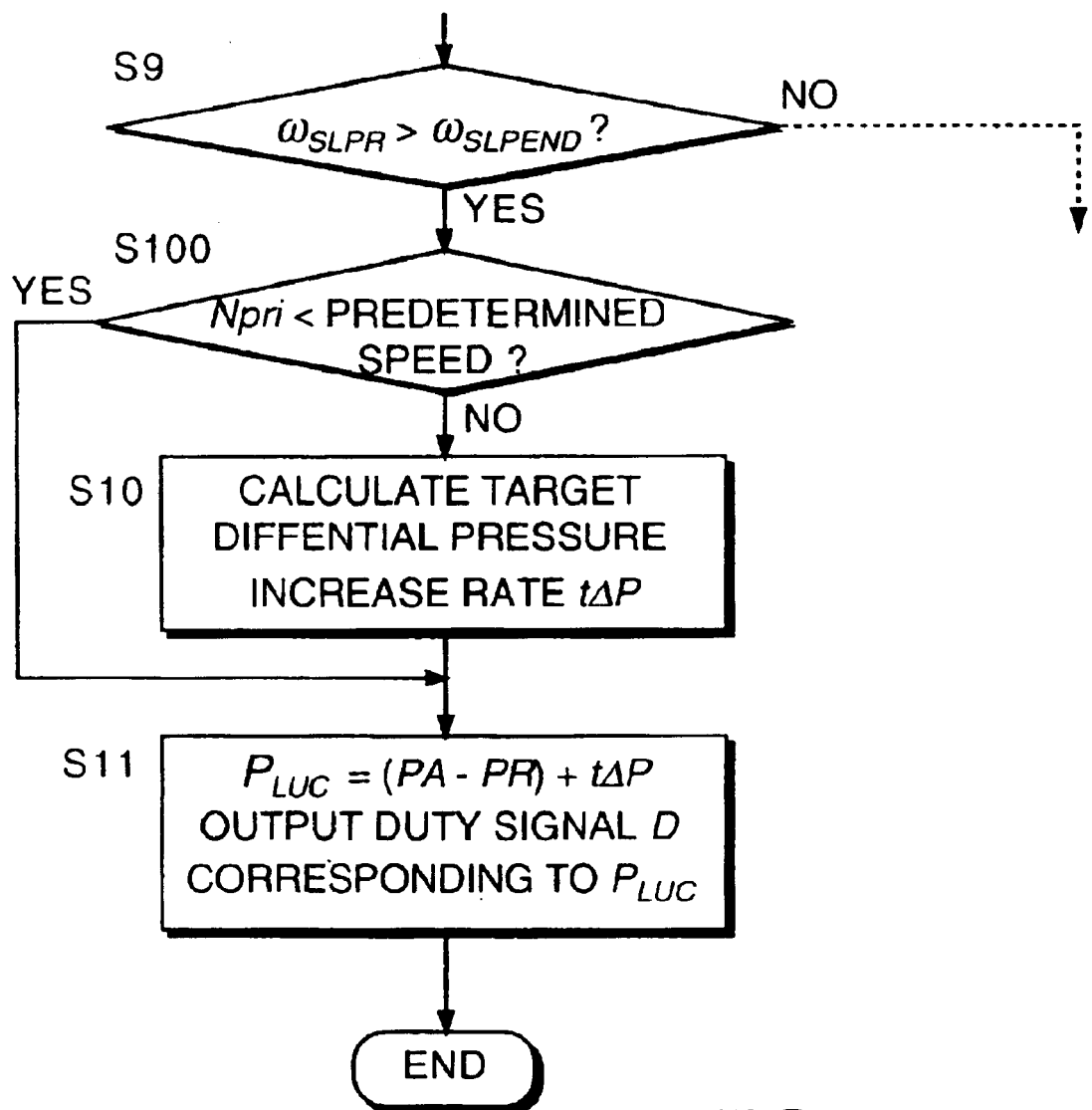
FIG. 13 is similar to FIG. 7, but showing a second embodiment of this invention.

The routine of FIG. 13 is equivalent to the routine of FIG. 7 to which a step S100 is added. The other steps are identical to those of the routine of FIG. 7.

If an upshift of the automatic transmission 23 is performed, the input rotation speed Npri of the automatic transmission 3 will relatively be smaller than in the case where an upshift of the automatic transmission 23 is not performed. In the routine of FIG. 7 of the first embodiment, if the input rotation speed Npri does not increase, the target differential pressure $P_{LUC}$ no longer increases. Therefore, if an upshift operation of the automatic transmission 3 is performed during open loop control of the engaging pressure of the lockup clutch 2, a large delay will arise in the lockup of the lockup clutch 2. As a result, lockup is not complete until the vehicle speed VSP becomes large, and the state wherein the torque transmission efficiency is low continues over a long period of time.

In this embodiment, by providing the step S100, the delay in lockup of the lockup clutch 2 due to the upshift of the automatic transmission 3, is prevented.

In the step S100, the controller 5 compares the input rotation speed Npri of the automatic transmission 3 with a predetermined rotation speed. When the input rotation speed Npri is more than the predetermined rotation speed, the calculation of the target increase rate tΔP of the differential pressure (PA–PR) of the step S10 is skipped, and the target differential pressure $P_{LUC}$ is calculated in the step S11. The target increase rate tΔP used for this calculation is the target increase rate tΔP calculated on the last occasion when the step S10 was executed.

By constructing the routine for controlling the lockup engaging pressure in this way, unless the input rotation speed Npri is less than the predetermined rotation speed, the target differential pressure $P_{LUC}$ increases by a fixed ratio regardless of whether there is an upshift of the automatic transmission 3, Therefore, even if the automatic transmission 3 performs an upshift, unless the input rotation speed Npri is less than the predetermined rotation speed, a large delay in completion of lockup does not arise.

Referring to FIGS. 14A–14C, if the automatic transmission 23 performs an upshift in the slip region, an increase rate of the rotation speed $\omega_{TR}$ of the turbine runner 1b, i.e., an increase rate of the input rotation speed Npri of the automatic transmission 3 will fall. As the target increase rate tΔP becomes small in the routine of FIG. 7 of the first embodiment at this time, a large delay arises in lockup completion of the lockup clutch 2 as shown by the dotted lines of FIGS. 14A and 14B. On the other hand, according to the routine of FIG. 13, even if the rotation speed $\omega_{TR}$ of the turbine runner 1b falls, unless the input rotation speed Npri is less than the predetermined rotation speed, the target differential pressure $P_{LUC}$ then increases in a fixed ratio.

In this embodiment, when the input rotation speed Npri is more than the predetermined rotation speed in the step S100, the target increase rate tΔP is fixed, but it is also possible to prevent the delay of the lockup accompanying the upshift of the automatic transmission 23 using other parameters. For example, after detecting an upshift of the automatic transmission 23 from the increase rate ΔNpri of the input rotation speed Npri or the real speed ratio ip, it is also possible not to update the target increase rate tΔP.

Next, referring to FIG. 15, a third embodiment of this invention relating to the routine for controlling the lockup engaging pressure will be described. In this embodiment, instead of the routine of FIG. 13 of the second embodiment, the controller 5 performs a routine of FIG. 15. The remaining features of the construction are identical to those of the second embodiment.

Figure 15:
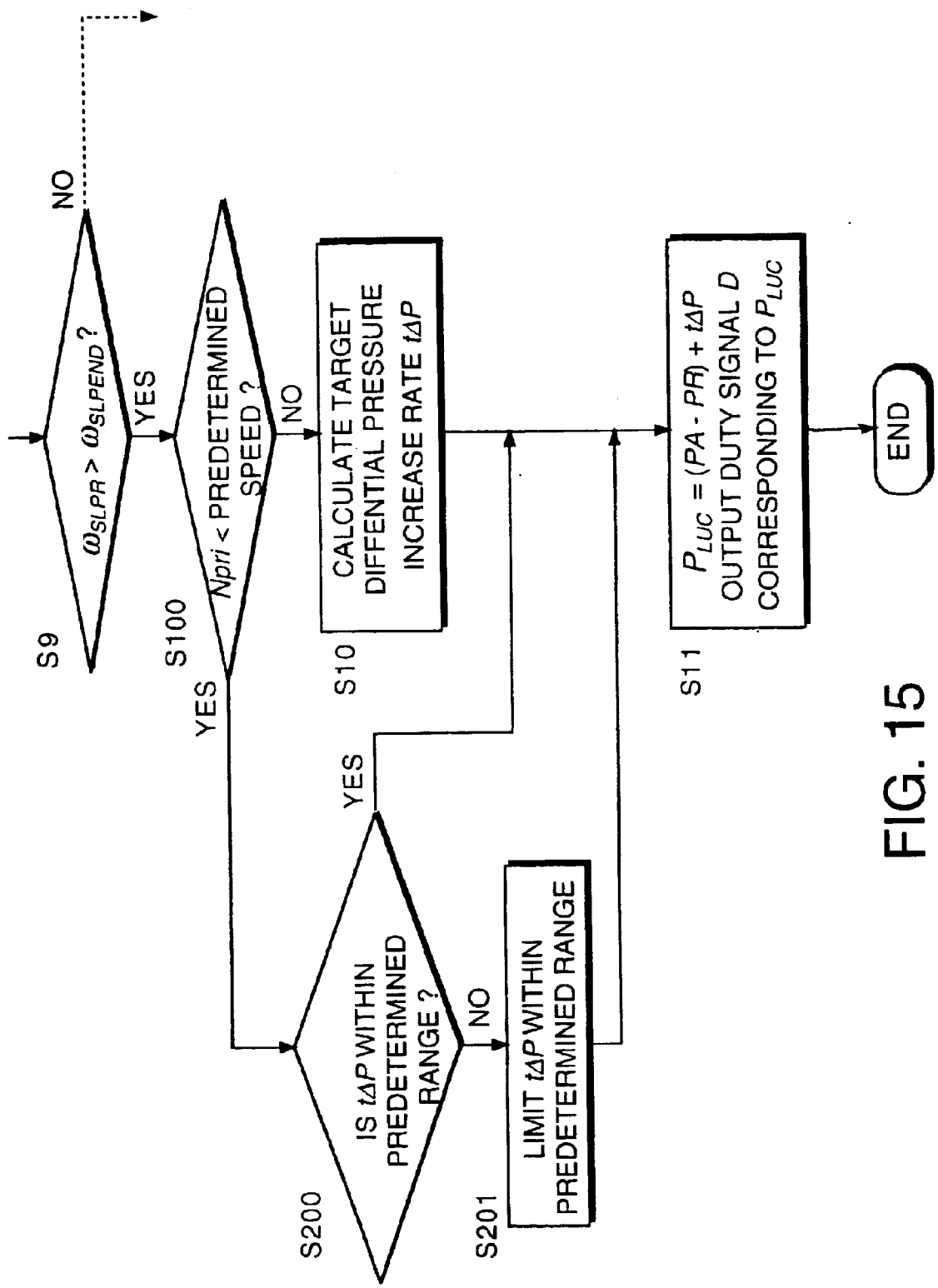
FIG. 15 is similar to FIG. 7, but showing a third embodiment of this invention.

The routine of FIG. 15 is equivalent to the routine of FIG. 13 to which steps S200, S201 are added. The remaining steps are identical to those of the routine of FIG. 13.

Also in the routine of FIG. 15, when the input rotation speed Npri is more than a predetermined rotation speed in the step S100, the target increase rate tΔP is fixed. In the routine of FIG. 13, the target increase rate tΔP calculated in the last execution of the step S10 was applied to the fixed increase rate. In the routine of FIG. 15, by adding an upper limit and lower limit to the target increase rate tΔP used as the fixed increase rate lockup completion is performed in a more fixed vehicle speed range.

The steps S200 and S201 are steps for performing this limitation.

When the input rotation speed Npri is more than the predetermined rotation speed in the step S100, the controller 5 determines whether or not the target increase rate tΔP calculated on the last execution of the step S10 in the step S200, i.e., the target increase rate tΔP which should be used as the fixed increase rate, is within the preset upper and lower limits. The upper limit is a value for preventing the lockup clutch 2 from performing a lockup rapidly and generating an engaging shock due to an excessive increase rate. On the other hand, the lower limit is set based on the maximal permissible amount of the delay in the lockup of the lockup clutch 2.

Figure 16:
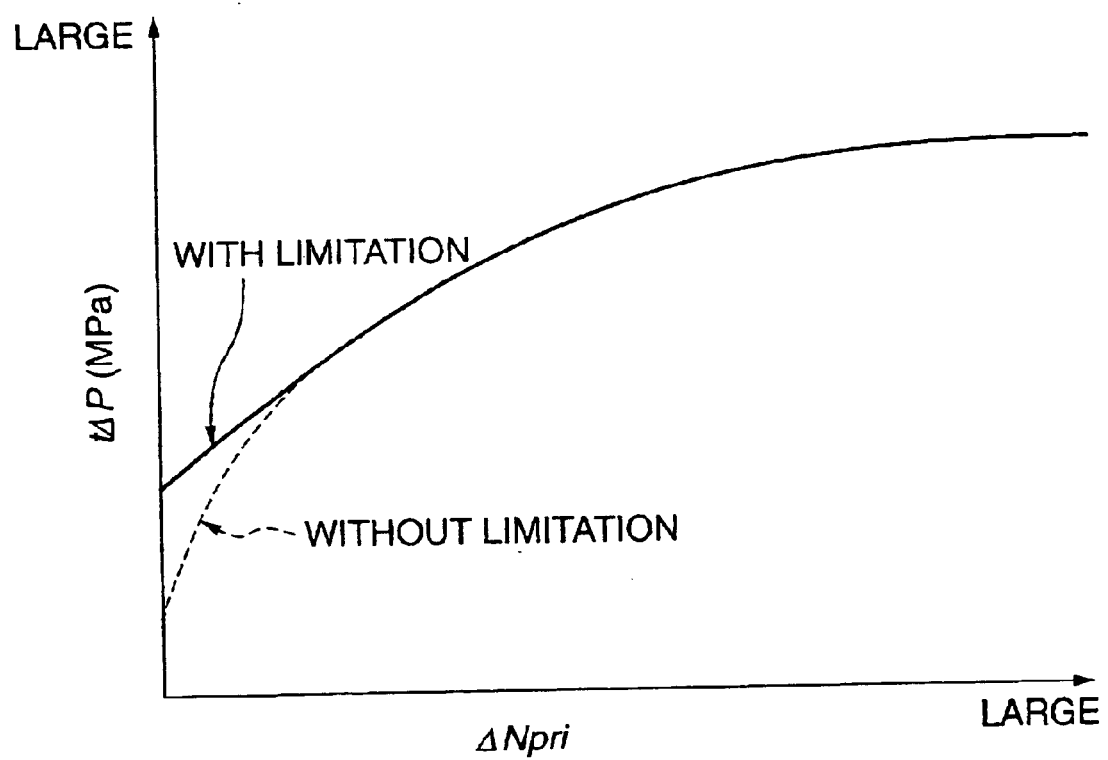
FIG. 16 is a diagram describing the characteristics of a differential pressure increase rate map stored by the controller according to the third embodiment.

When the target increase rate tΔP which should be used as the fixed increase rate in the step S200 is within the range of the upper limit and lower limit, the controller 5, in a step S11, calculates the target differential pressure $P_{LUC}$ using this target increase rate tΔP. On the other hand, when the target increase rate tΔP which should be used as the fixed increase rate in the step S200 is more than the upper limit or is less than the lower limit, the controller 5, in the step S201, controls the target increase rate tΔP to the upper limit or lower limit. As a result of this control, the target increase rate tΔP used as the fixed increase rate does not fall below the lower limit regardless of the increase rate ΔNpri of the input rotation speed Npri, as shown by the solid line of FIG. 16. The controller 5, in the step S11 calculates the target differential pressure $P_{LUC}$ using the value limited in the step S201.

Referring to FIGS. 17A–17C, when the input rotation speed Npri has increased to more than the predetermined rotation speed, the controller 5 determines whether or not the target increase rate tΔP calculated in the last execution of the step S10 is within a predetermined range specified by the upper limit and the lower limit. Herein, as the target increase rate tΔP is less than the lower limit, the target increase rate tΔP is set equal to the lower limit. Subsequently, the calculation of the target differential pressure $P_{LUC}$ is performed using this value.

As a result, as shown in FIG. 17B, the slope of the target differential pressure $P_{LUC}$ after the input rotation speed Npri reaches the predetermined rotation speed becomes steeper than before.

In FIGS. 17A–17C, the case where the target increase rate tΔP calculated in the last execution of the step S10 was less than the lower limit was described, but when the target increase rate tΔP calculated in the last execution of the step S10 exceeds the upper limit, the controller 5, after setting the target increase rate tΔP equal to the upper limit in the step S201, calculates the target differential pressure $P_{LUC}$ in the step S11. In this case, after the input rotation speed Npri reaches the predetermined rotation speed, the slope of the target differential pressure $P_{LUC}$ becomes gentler than before, and the time for the lockup clutch 2 to lock up increases.

According to this embodiment, unless the input rotation speed Npri is less than the predetermined rotation speed, the lockup of the lockup clutch 2 will definitely be completed within a fixed vehicle speed range regardless of whether or not there was an upshift of the automatic transmission 3.

In the second and third embodiments, the reason why the target increase rate tΔP is fixed only in the case where the input rotation speed Npri is not less than the predetermined rotation speed, is as follows.

Referring to FIGS. 18A–18C, before the input rotation speed Npri reaches the predetermined rotation speed, the increase of the input rotation speed Npri of the automatic transmission 23, i.e., the increase of the rotation speed $\omega_{TR}$ of the turbine runner 1b, may stop depending on the road surface situation and the output torque of the automatic transmission 23. In such a case, if the target increase rate tΔP is restricted to the lower limit, only the differential pressure of the lockup clutch 2 rises and lockup is completed as shown by the dotted line of FIG. 18B while the rotation speed $\omega_{TR}$ does not increase, as shown in FIG. 18A. As a result, as shown by the dotted line of FIG. 18A, a large level difference arises in the engine rotation speed Ne before and after lockup, and the same problem as that of the aforesaid prior art example occurs. To avoid this problem, when the input rotation speed Npri is less than the predetermined rotation speed in the second and third embodiments, it is not attempted to fix the target increase rate tΔP. It is also possible to determine whether or not to fix the target increase rate tΔP based on the elapsed time in the slip region instead of the input rotation speed Npri.

The contents of Tokugan 2002-302894 with a filing date of Oct. 17, 2002 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

For example, the above embodiments relate to the case where open loop control is applied in the first half of the slip region, and feedback control is applied in the second half of the slip region with respect to control of the differential pressure of the lockup clutch. However, this invention may be applied to a control device which performs open loop control of the differential pressure of the lockup clutch over the whole of the slip region.

In the embodiments described above, although the rotation speed of the turbine runner is detected using the rotation speed sensor 23, the rotation speed of the turbine runner may be determined by any other means. This invention is not dependent on the method of obtaining the rotation speed of the turbine runner, and may be applied to any lockup control device for a torque converter which executes the claimed control using the rotation speed of the turbine runner.

The embodiments of this invention in which an exclusive property or privilege is claimed are defined as follows:

What is claimed is:

1. A lockup control device for a torque converter for a vehicle, the torque converter comprising a pump impeller and a turbine runner transmitting therebetween a torque via a fluid, and a lockup clutch which engages the pump impeller and turbine runner under an engaging force in response to an oil pressure, the device comprising:
   an oil pressure control valve which supplies the oil pressure to the lockup clutch;
   a sensor which detects a rotation speed of the turbine runner; and
   a controller programmed to:
      calculate a speed increase rate of the turbine runner from the rotation speed of the turbine runner;
      determine a target oil pressure based on a pressure increase rate which is set to increase as the speed increase rate increases; and
      cause the oil pressure control valve to supply the target oil pressure to the lockup clutch.

2. The lockup control device as defined in claim 1, wherein the controller is further programmed to compare the rotation speed of the turbine runner with a predetermined rotation speed, and when the rotation speed of the turbine runner exceeds the predetermined rotation speed determine a subsequent target oil pressure based on the pressure increase rate when the rotation speed of the turbine runner exceeded the predetermined rotation speed.

3. The lockup control device as defined in claim 2, wherein the controller is further programmed to compare the pressure increase rate when the rotation speed of the turbine runner exceeded the predetermined rotation speed with a predetermined range, and when the pressure increase rate lies outside the predetermined range, correct the pressure increase rate to the predetermined range.

4. The lock up control device as defined in claim 1, wherein the pump impeller is connected to an engine of the vehicle, and the turbine runner is connected to an automatic transmission of the vehicle.

5. The lock up control device as defined in claim 4, wherein the control device further comprises a sensor which detects a vehicle speed, and the controller is further programmed, when the vehicle speed does not reach a predetermined speed, to cause the oil pressure control valve to supply the oil pressure corresponding to the engaging force of zero.

6. The lockup control device as defined in claim 1, wherein the lockup clutch comprises a clutch which varies an engaging force according to a differential pressure between an application pressure and a release pressure, and the oil pressure control valve comprises a spool valve which varies the differential pressure in response to a signal pressure generated by a solenoid according to a signal from the controller.

7. A lockup control device for a torque converter for a vehicle, the torque converter comprising a pump impeller and a turbine runner transmitting therebetween a torque via a fluid, and a lockup clutch which engages the pump impeller and turbine runner under an engaging force in response to an oil pressure, the device comprising:

an oil pressure control valve which supplies the oil pressure to the lockup clutch;

means for determining a rotation speed of the turbine runner;

means for calculating a speed increase rate of the turbine runner from a rotation speed of the turbine runner;

means for determining a target oil pressure based on a pressure increase rate which is set to increase as the speed increase rate increases; and means for causing the oil pressure control valve to supply the target oil pressure to the lockup clutch.

8. A lockup control method for a torque converter for a vehicle, the torque converter comprising a pump impeller and a turbine runner transmitting therebetween a torque via a fluid, a lockup clutch which engages the pump impeller and turbine runner under an engaging force in response to an oil pressure, and an oil pressure control valve which supplies the oil pressure to the lockup clutch, the method comprising:

determining a rotation speed of the turbine runner;

calculating a speed increase rate of the turbine runner from a rotation speed of the turbine runner;

determining a target oil pressure based on a pressure increase rate which is set to increase as the speed increase rate increases; and causing the oil pressure control valve to supply the target oil pressure to the lockup clutch.

* * * * *